United States Patent
Engel

(10) Patent No.: US 10,933,385 B2
(45) Date of Patent: Mar. 2, 2021

(54) FLUID MIXING SYSTEM FOR MIXING COMPONENTS FOR A FLUID PRODUCT

(71) Applicant: Krones AG, Neutraubling (DE)

(72) Inventor: Erwin Engel, Donaustauf (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/508,236

(22) Filed: Jul. 10, 2019

(65) Prior Publication Data
US 2020/0016550 A1 Jan. 16, 2020

(30) Foreign Application Priority Data
Jul. 10, 2018 (DE) .......................... 102018211406.4

(51) Int. Cl.
*B01F 3/00* (2006.01)
*A23L 2/52* (2006.01)

(52) U.S. Cl.
CPC .............. *B01F 3/0092* (2013.01); *A23L 2/52* (2013.01); *A23V 2002/00* (2013.01)

(58) Field of Classification Search
CPC ....... B01F 3/0092; A23L 2/52; A23V 2002/00
USPC ...................................................... 222/145.5
See application file for complete search history.

(56) References Cited

U.S. PATENT DOCUMENTS

| 5,086,806 | A | * | 2/1992 | Engler | .................. | G01F 15/003 |
| | | | | | | 137/486 |
| 6,387,424 | B2 | * | 5/2002 | Funk | ..................... | A47J 31/402 |
| | | | | | | 426/231 |
| 2005/0109792 | A1 | | 5/2005 | Fiorini et al. | | |
| 2017/0042178 | A1 | | 2/2017 | Black | | |
| 2017/0349421 | A1 | * | 12/2017 | Cleland | ................ | B67D 1/0021 |

FOREIGN PATENT DOCUMENTS

| DE | 102007021324 A1 | * | 11/2008 | ............. | G01N 21/31 |
| DE | 102007021324 A1 | | 11/2008 | | |
| DE | 102016107730 A1 | | 10/2017 | | |

* cited by examiner

*Primary Examiner* — Vishal Pancholi
(74) *Attorney, Agent, or Firm* — McCoy Russell LLP

(57) ABSTRACT

Fluid mixing system for mixing components for a fluid product comprising a mixing regulator for mixing the components and a feed comprising at least two separate conduits, where a base component can be supplied to the mixing regulator in a first conduit and a component to be admixed in a second conduit, where a first sensor for determining the concentration of a chemical compound in the component to be admixed and a Brix sensor for determining a Brix value of the component to be admixed are disposed upstream of the mixing regulator in the second conduit and where a control unit is provided which can control the mixing process of the components by the mixing regulator in dependence of the concentration measured and the Brix value measured.

15 Claims, 2 Drawing Sheets

FLUID MIXING SYSTEM FOR MIXING COMPONENTS FOR A FLUID PRODUCT

CROSS REFERENCE TO RELATED APPLICATIONS

The present application claims priority to German Application No. 10 2018 211 406.4 entitled "FLUID MIXING SYSTEM FOR MIXING COMPONENTS FOR A FLUID PRODUCT" filed Jul. 10, 2018. The entire contents of the above listed application is hereby incorporated by reference for all purposes.

TECHNICAL FIELD

The present invention relates to a fluid mixing system for mixing components for a fluid product and a mixing method for a fluid product.

BACKGROUND AND SUMMARY

Fluid mixing systems and corresponding methods are used in prior art, in particular in the beverage processing industry, where products are produced from water with the addition of one or more flavoring components, such as syrup. In order to ensure a consistent quality of the product produced from these components, the mixing ratio of the components to be mixed (syrup or the like) to a base component, such as water, must be maintained as accurately as possible. While the flow rates of syrup and water are easily adjustable, the concentration of flavoring substances in the syrup is sometimes subject to fluctuations which can alter the quality of the mixed product.

For this purpose, DE 10 2016 107 730 A1 proposes to measure an influence of optical radiation in the product to determine its composition after completion of the fluid product (i.e. mixing of the respective components). Although this enables reliably determining the composition of the product, it can be disadvantageous since the respective product is potentially discarded if an incorrect mixture is detected.

The technical problem to be solved is therefore to provide a fluid mixing system and a corresponding method with which the composition of the fluid product can be reliably determined, at the same time minimizing the amount of product needing to be discarded.

The fluid mixing system according to the disclosure for mixing components for a fluid product comprises a mixing regulator for mixing the components and a feed comprising at least two separate conduits, wherein a base component can be supplied to the mixing regulator in a first conduit and a component to be admixed in a second conduit, where a first sensor for determining the concentration of a chemical compound in the component to be admixed and a Brix sensor for determining a Brix value of the component to be admixed are disposed upstream of the mixing regulator in the second conduit and where a control unit is provided which can control the mixing process of the components by the mixing regulator in dependence of the concentration measured and the Brix value measured.

The Brix value is a generally known value, where a reading in degrees Brix (° Bx) means that the density of the fluid measured corresponds to the density of a solution of saccharose in water and contains as many grams of saccharose for every 100 grams of the solution. The Brix signal can be distorted by the presence of other chemical compounds in the component to be admixed, such that a measured Brix value does not correspond to the real concentration of the flavoring substances in the component to be admixed. By additionally using the first sensor for determining the concentration of a chemical compound of a component to be admixed, the actual Brix signal can be adjusted by the signal of the first sensor so that the actual Brix signal for the flavoring chemical compounds (or of other compounds to be considered) can be determined. By use thereof, the quantity of flavoring compounds in the product to be admixed can then advantageously be determined and the mixing regulator can be controlled.

It is provided in one embodiment that the first sensor is a spectroscopic sensor or comprises a spectroscopic sensor. It is possible with the aid of spectroscopic sensors to search selectively for specific chemical compounds and these sensors can also output a specific signal, so that not only the presence of further chemical compounds but also their quantity can be determined.

In one development of this embodiment, the spectroscopic sensor is adapted to detect signals of chemical compounds in at least two wavelength ranges in the infrared range. The compounds to be considered usually have distinguishing emission or absorption lines in the infrared range, so that they can be detected with a respective measurement.

In one further embodiment, it is provided that the second conduit leads from a buffer tank to the mixing regulator and that the first sensor and the Brix sensor are arranged at a distance from the buffer tank that corresponds to at least half the length, preferably at least 75% of the length of the conduit, measured along the conduit. The sensors are then, to the extent possible, arranged at the mixing regulator and controlling the mixing regulator in dependence of the measured values relates reliably to the quantity of fluid that has passed directly along the sensors. The unintentionally incorrect mixing of other components and, consequently, the unintentional production of product needing to be discarded can thus be minimized to the extent possible.

Furthermore, a filling system can be provided for filling a fluid product, such as a beverage, into a container, where the filling system comprises at least one filling station, which can fill the product into the container, and a fluid mixing system according to one of the preceding embodiments, where the fluid mixing system is connected to the filling station and can supply the product to the filling station. It is understood that one fluid mixing system can be provided for all filling stations, but also one fluid mixing system separately for each filling station. The respective fluid mixing systems can be supplied from single or multiple buffer tanks, respectively, for each one component of the product to be produced.

It can further be provided that a buffer tank is arranged downstream of the fluid mixing system and upstream of the filling station, where the ready-mixed product can be supplied from the fluid mixing system to the buffer tank and remain in the buffer tank until it is supplied to the filling station to be filled into a container.

In one development of this embodiment, the buffer tank is pressurized, in particular subject to a pressure of a gas to be removed from the mixture.

The mixing method according to the disclosure for a fluid product which consists of at least two components comprises the use of a fluid mixing system, where a mixing regulator of the fluid mixing system mixes a base component which is supplied to the mixing regulator from a first conduit and a component to be admixed which is supplied to the mixing regulator from a second conduit, and a control unit controls the mixing regulator according to a concentration of a chemical compound in the component to be admixed which was measured by a first sensor disposed in the second conduit and a Brix value in the component to be admixed which was measured by a Brix sensor disposed in the second conduit. Precisely controlling the mixture of the components to produce fluid product is realized with this method.

In one embodiment, the control unit controls the mixing regulator in real time in dependence of the concentration of the chemical compound measured and the Brix value measured. This real-time controlling means that every reading taken by the first sensor and the Brix sensor leads to a control action by the mixing regulator. This control action can also be to determine that changing the mixing ratio by the mixing regulator is not necessary. The control action in real time also means that the delay between the sensors reading the values and the control action by the mixing regulator is as short as possible, preferably in the range of a few milliseconds.

This entails the advantage that the product always has the appropriate concentration of compounds contained in the component to be admixed.

It can further be provided that a quantity of component to be admixed corresponding to the Brix value and a quantity of the base component are each summed up separately by the control unit for controlling the mixing regulator and the control unit controls the mixing regulator such that the sum of the quantity of component to be admixed and the quantity of the base component corresponds to an intended target value. The predetermined target value can correspond, for example, to a desired Brix value of the completed product, so that quantity-dependent controlling can advantageously be regulated accordingly.

In one development of this embodiment, the summed up value of the quantity of components to be admixed and the summed up value of the quantity of the base component are reduced to a basic value after a predetermined time interval and/or after the application of a predetermined quantity of the base component and/or the component to be admixed. This can be realized, for example, by "shortening" the sums that have accrued so far or by setting the values to a predetermined value. "Resetting" can ensure that the accumulated or collected quantities of substance quantity are not significantly less than the substance quantity already measured, so that a sufficient control signal can still be generated. This ensures precise controlling.

Furthermore, it can be provided that the first sensor is or comprises a spectroscopic sensor and measures the quantity of the chemical compound by measuring the emission behavior of the component to be admixed. Such measurements are very accurate and enable the most error-free controlling by the mixing regulator.

In one development of this embodiment, the spectroscopic sensor measures the emission behavior in at least two wavelength ranges in the infrared range.

Furthermore, it can be provided that the base component is water and the component to be admixed is a fluid syrup. While other configurations are conceivable, this is the most common in the beverage processing industry and can therefore be improved advantageously in terms of the mixing behavior.

In one embodiment, the Brix sensor measures a Brix value of a flavoring chemical compound in the component to be admixed, and the first sensor measures the presence and quantity of at least one other chemical compound that can affect the value measured by the Brix sensor. A signal of a chemical compound that could affect the value measured by the Brix sensor can therefore be advantageously calculated from the reading of the Brix sensor.

For controlling the mixing regulator, the control unit in one development of this embodiment uses the value measured by the Brix sensor, which is corrected based on the value measured by the first sensor, for controlling the mixing regulator.

DETAILED DESCRIPTION

Figure 1:
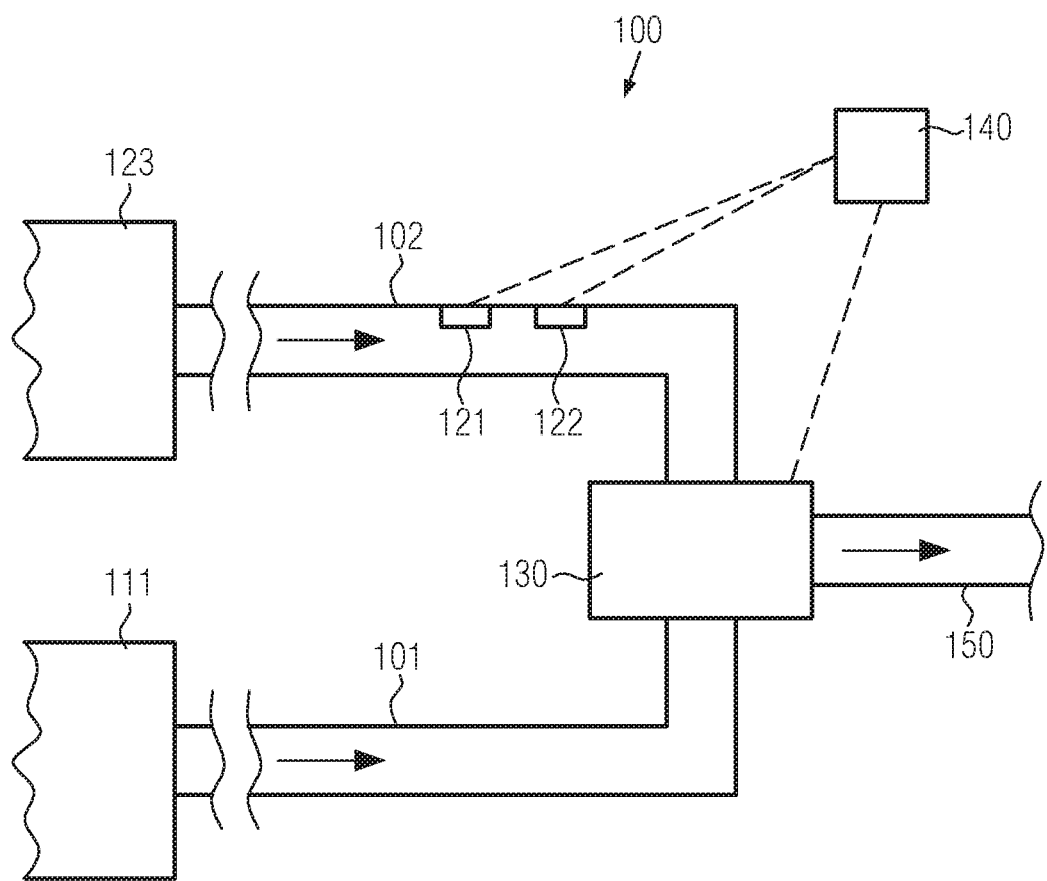
FIG. 1 shows a schematic representation of a fluid mixing system according to one embodiment.

FIG. 1 schematically shows a fluid mixing system 100 according to one embodiment of the disclosure. The fluid mixing system comprises a first conduit 101 and a second conduit 102 which supply components of a fluid product to be produced to a mixing regulator 130. This mixing regulator then mixes the components supplied and can dispense them via discharge conduit 150. In discharge conduit 150, the product consisting of the components delivered in conduits 101 and 102 is transported away from the mixing regulator along the arrow direction shown, for example to a filling station of a filling system, in order to be filled into a container.

According to one embodiment, first conduit 101 transports a base component which can form the (quantitative) base for the fluid product to be produced. This base component can be, for example, water. Other fluids are presently conceivable.

A component to be admixed to the base component is transported in second conduit 102. This component to be admixed can also be a fluid. However, gases such as $CO_2$ or gaseous fluids can also be transported. When a fluid is transported in conduit 102, it may be a flavored syrup such as is typically used in the production ready-to-drink beverages.

Conduit 101 and conduit 102 can each be connected to a suitable storage tank (also referred to as a buffer tank) for the components (i.e. base component for conduit 101 and component to be admixed for conduit 102). These storage tanks 111 and 123, for example, may be large cooled fluid storage tanks from which the respective component can be withdrawn. Alternatively or additionally, one or more containers or regions can be provided in which the base component (such as water) is degassed before it is supplied to conduit 101.

Although presently not shown in FIG. 1, either a filling station, from which the ready-mixed product is filled into a container, can be arranged downstream of the mixing regulator in or after discharge conduit 150, or one or more further buffer tanks (also buffer containers) can be provided, into which the ready-mixed product can be delivered by the discharge conduit, to be stored there, for example, for further use. It can also be provided that such a buffer tank is provided between the mixing regulator and a filling member, so that the finished product first passes through the buffer tank and can be temporarily stored therein and is subsequently supplied from the buffer tank to the filling station.

While only one first conduit 101 for a base component and one second conduit 102 for a component to be admixed are shown in the embodiment presently illustrated, it is to be understood that more than one conduit can be provided for a base component delivered therein and also more than one conduit for a component to be admixed. For example, in addition to a second conduit 102, which is shown in FIG. 1, a further conduit, in which a component to be mixed is also delivered, can be connected to the mixing regulator. It can then be another syrup or a gas or any other conceivable fluid.

It is provided that a first sensor 121 is arranged in second conduit 102 (or in each second conduit in which a component to be admixed to the base component is delivered) or connected to the respective conduit and is configured to measure the chemical compound in the component to be admixed. By way of example, this sensor can be a spectroscopic sensor which can register or detect the emission or absorption behavior of the component to be admixed (in a specific wavelength range) and with which the presence and concentration of at least one chemical compound can be determined. Most preferably, the chemical compound is sugar or compounds that are used in the food industry as a sugar substitute, such as stevia.

A Brix sensor 122 is further arranged in the second conduit. This Brix sensor is configured to output a signal suitable to determine in degrees Brix (° Bx) the density of the component to be admixed that is delivered in conduit 102. The reading in degrees Brix indicates the density of the measured fluid in a form indicating that the density in relation to the density of a solution of saccharose in water contains as many grams of saccharose per 100 g of solution. This means, for example, a fluid having a Brix value of 30° Bx in terms of its density corresponds to a solution of saccharose in water which contains 30 g of saccharose in 100 g of solution of saccharose and water, i.e. contains only 70 g of water.

For this purpose, the Brix sensor measures the density of the component to be admixed, or, in general, of a fluid. For a fluid containing only one additional substance besides water, it is sufficient to measure the Brix value to deduce the quantities of that particular substance contained in the fluid.

However, since the component to be admixed usually contains not only flavoring chemical compounds (aromas or the like) but also sugar or, as mentioned above, sugar substitutes, the Brix signal can be distorted by the presence of the sugars or sugar substitutes and determining the concentration of the flavoring compound then becomes inaccurate.

For this purpose, the readings by first sensor 121 and Brix sensor 122 in one embodiment are supplied to a control unit 140 which controls mixing regulator 130 based on the value of the chemical compound concentration measured by first sensor 122 and the Brix value of the component to be admixed measured by Brix sensor 122 such that the mixture of the components to be admixed with base component 101 to the fluid product preferably has a constant Brix value with respect to a desired compound in the component to be admixed, which is independent of fluctuations in the Brix value of the component to be admixed.

The signal of first sensor 121, with which, for example, the concentration of sugar or sugar substitutes, such as stevia, is selectively determined in the component to be mixed, is used to correct the Brix value of the component to be admixed that is measured by Brix sensor 122.

For example, it can be provided for this purpose in one embodiment that the value for the concentration of the chemical compound measured by first sensor 121 is converted into a corresponding Brix value, and this Brix value is subtracted with the aid of control unit 140 from the Brix value of the component to be admixed that is measured in sensor 122, so that the Brix value now obtained corresponds to the Brix value of a specific chemical compound in the component to be admixed, in particular, of a flavoring component or flavoring chemical compound. Once this Brix value is known, the ratio of the component to be admixed to the base component can be adjusted by controlling the mixing regulator such that the Brix value of the resulting fluid product assumes a predetermined value (in relation only to the particular chemical compound).

While only one sensor 121 is provided in the embodiment shown in FIG. 1, several sensors can also be provided, each of which selectively measures the concentration of certain ingredients in the component to be admixed which, for example, influence the value measured by Brix sensor 122. All of these values measured can then be used to correct the Brix sensor signal.

Sensor 121 or any corresponding sensor is configured as a spectroscopic sensor and can therefore selectively determine the presence and concentration of chemical compounds in the component to be admixed on the basis of the measurement of specific emission or absorption lines. A correction value for the value measured by the Brix sensor can therefore be selectively determined and controlling or regulating the mixing regulator 130 can take place in dependence on the Brix value measured.

Sensors are presently conceivable which in particular enable a measurement in a spectroscopic manner in the infrared range, and particularly preferably in at least two wavelength ranges of the infrared range. The infrared range typically comprises wavelengths in the range of 10-3 m to 7.8×10-7 m or 3×1011 Hz to 4×1014 Hz, respectively. The two wavelength ranges can be separate parts of this spectrum or partially overlap. Identification of chemical compounds, such as multiple sugars, can be carried out particularly reliably therewith, since not only the emission or absorption is measured restricted to one wavelength, but in two wavelength ranges.

The control unit preferably controls the mixing regulator in real time, depending on the values determined by first sensor 121 and Brix sensor 122 and optionally by the control unit, based on the value measured by first sensor 121, of the calculated correction value for the value measured by Brix sensor 122. Real-time controlling comprises that each measurement by the first sensor and the Brix sensor be assigned a control of the mixing regulator by the control unit. On the basis of a pair of values, consisting of a value measured by the first sensor and the value measured by the Brix sensor, the control unit then controls the mixing regulator according to a preferred embodiment to adjust the ratio between component to be admixed and the base component. It can be that the Brix value (corrected by the value measured by first sensor 121) of the component to be admixed remains constant over several measurements. In this case, the control unit controlling the mixing regulator does not comprise changes in the mixing ratio between the component to be admixed and the base component, as long as the corresponding Brix value corresponds to a predetermined target value. Nevertheless, the control unit performs at least one verification as to whether the Brix value measured (corrected by the derived correction value determined by the first sensor) corresponds to the target value. This procedure should also be understood as part of the real-time controlling the mixing regulator. The control unit methods and routines as disclosed herein may be stored as executable instructions in non-transitory memory and may be carried out by the control unit in combination with various sensors, valves, regulators, and other fluid mixing system and/or filler station components.

The specific routines described herein may represent one or more of any of a number of processing strategies. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. Further, the described actions, operations, and/or functions may graphically represent code to be programmed into non-transitory memory of the computer readable storage medium in the control unit, where the described actions are carried out by executing instructions in the fluid mixing system and/or filler station in combination with the control unit.

The fact that controlling the mixing regulator takes place in real time preferably comprises a time interval which is less than 1 s, in particular less than 0.1 s, preferably less than 10-2 s is given between the measurement by sensors 121 and 122 and controlling mixing regulator 130 It can then be prevented that a large quantity of fluid product possibly not corresponding to the target value is produced in the meantime.

In one embodiment, first sensor 121 and Brix sensor 122 are arranged as close as possible to the mixing regulator, so that the fluid volume between the sensors and the mixing regulator is minimized and a possible incorrect mixture of this volume due to the values of a volume of the component to be admixed that is subsequent to this volume remains as small as possible. If, for example, second conduit 102 has the length 1, measured from the outlet of the storage tank 123 along the course of second conduit 102 to mixing regulator 130, then first sensor 121 and Brix sensor 122 can be arranged in a region of second conduit 102, which is arranged at a distance, measured along the course of second conduit 102, which corresponds to at least half the length 1 of conduit 102. In an embodiment, the sensors 121 and 122 are arranged at a distance from the product storage tank, measured along conduit 102, that corresponds to at least 75% of the total length 1 of the second conduit. Thus, the distance is measured along the way of the conduit 102 and thus not necessarily along a straight line (for example in case the conduit is curved).

In order to ensure that mixing regulator 130 is controlled by the control unit in the most efficient manner possible, it can be provided that the controlling process is not based on current substance flows (i.e. quantity of substance per unit time), but in dependence of the total quantity of substance that is withdrawn from the component to be admixed and the base component. To ensure this, the mixing regulator is controlled such that the mixing ratio is controlled according to the total quantity of substance used. For example, given a target Brix value, a specific quantitative ratio for a finished fluid product is intended between the component to be admixed and the base component. To regulate the substance sums, it is therefore preferred to add up the quantity of component to be admixed, in particular the total quantity of flavoring chemical compound, and separately the quantity of the base component. The control unit then uses the values measured by the sensors to control the quantity of component to be admixed in such a way that the total quantitative ratio between the flavoring compound in the component to be admixed and the base component is always constant. For example, if the Brix value of the flavoring compounds in the component to be admixed decreases for some reason, then the control unit increases the inflow of component to be admixed in the mixing regulator and possibly reduces the inflow of base component such that the ratio of flavoring components in the component to be admixed and the base component remains constant. It is therefore particularly advantageous to have only one relevant chemical compound be present for every component to be admixed, for which Brix-value-dependent controlling is to be performed. This makes it easier to correct fluctuations in the concentration of a relevant chemical compound.

Due to this register control, a very large quantity of substance (kilograms to tons, at least of the base component) accrues over time, whereas the inflow of syrup per second is typically only a few milliliters to liters. This can lead to the fact that accurately controlling the ratios between the base component and the component to be admixed can be done only with difficulty, since the small discrepancies due to the large total quantity accrued are difficult to calculate in the computer with high accuracy. In particular, forming the difference is then inaccurate. For this reason, the accrued sums can be reduced to a specific base value at certain time intervals or particularly preferably after a certain quantity of substance has been reached. This base value can be any number. However, it is particularly preferred to have the base value correspond to the smallest possible multiple of the ratio between the base component and the component to be admixed. For example, at a target mixing ratio of 1:3 of the component to be admixed to the base component, the base value can be 1 liter for the component to be admixed and 3 liters for the base component. Other base values are presently also conceivable and can be selected under convenience aspects.

Figure 2:
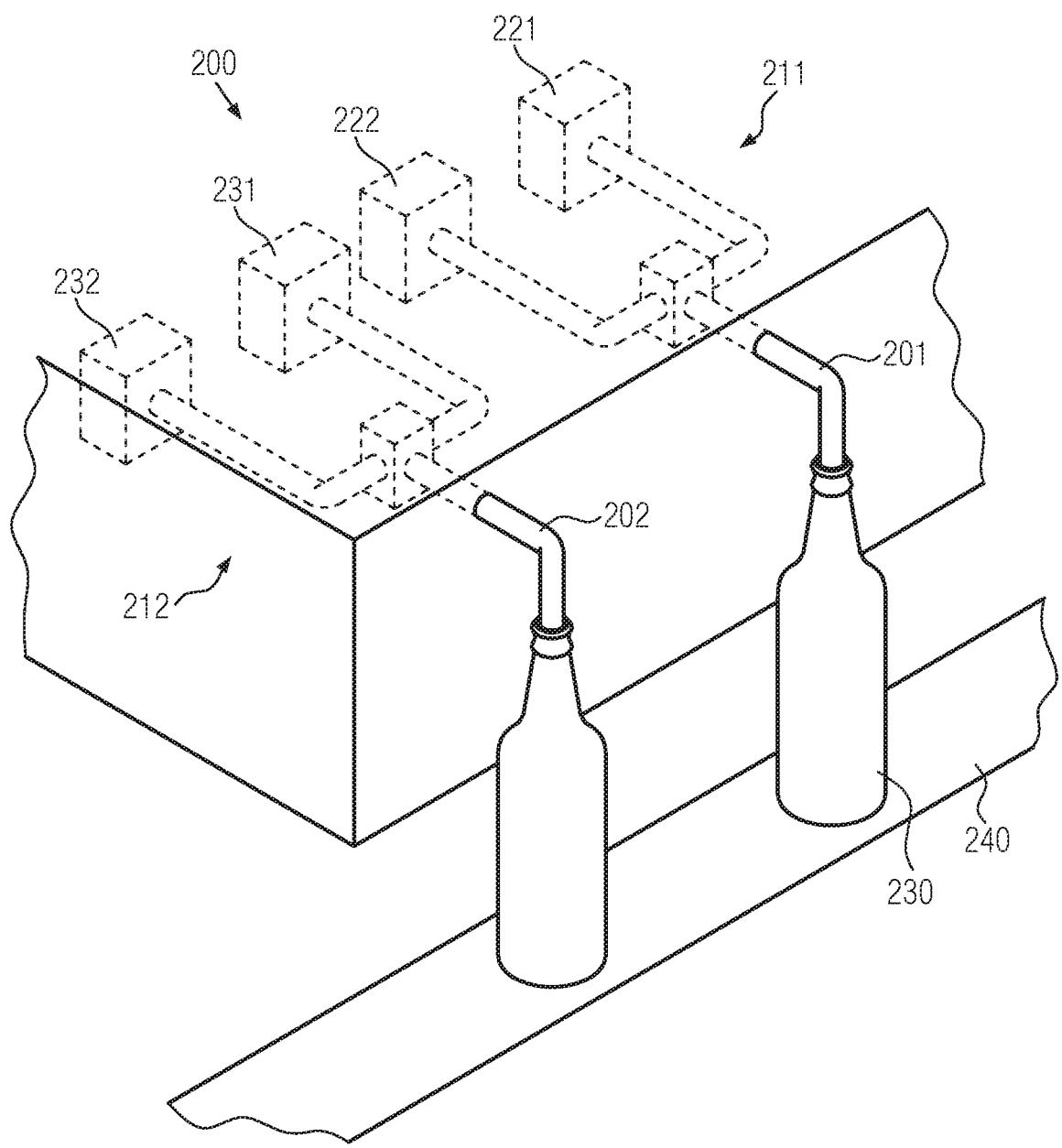
FIG. 2 shows a schematic representation of an embodiment of a filling system comprising the fluid mixing system according to the disclosure.

FIG. 2 shows an implementation of the fluid mixing system according to the embodiments described above in a filling system 200. The latter comprises several filling stations 201 and 202 and, in the embodiment presently shown, is configured as a linear filler filler. Containers 230 to be filled (for example, bottles, cans or the like) are transported along a conveyor line 240, which can be formed, for example, as a conveyor belt, and their opening region is positioned in the region of a filling station 201 or 202, respectively, so that a filling member (filling valve or the like) can fill fluid product into the containers. In the embodiment presently illustrated, each filling station is associated with a fluid mixing system 211 and 212 according to embodiments described above. Each of the fluid mixing system 211 and 212 there comprises a separate mixing regulator and the conduits and storage tanks 221 and 222 for fluid mixing system 211 and 231 and 232 for fluid mixing system 212 described with reference to FIG. 1. As already described, the base component and the one or more components to be admixed are stored in the fluid storage tanks.

While the embodiment according to FIG. 2 offers the advantage that the fluid product can be mixed separately for each filling station, and customization of the products filled into the individual containers is therefore possible, this embodiment is comparatively complex with regard to the material usage.

In one alternative embodiment, filling system 200 therefore comprises only a single fluid mixing system, where conduit 150 shown in FIG. 1, which discharges from the mixing regulator the fluid product that has been completely mixed by the mixing regulator, supplies each filling station. The discharge accordingly comprises several branch-offs.

The embodiment shown in FIG. 2 is merely by way of example and describes a linear filler as a filling system. Other embodiments are also conceivable in which the containers with the fluid product are filled with the aid of a respective fluid mixing system according to the embodiments described above. For example, the filling system can be configured as a carousel or provided comprising such. Respective filling stations, in which a container is received for the purpose of being filled with the fluid product, can be arranged along the periphery of the carousel in a co-rotating manner. The containers can then be supplied to the carousel and discharged from the carousel, for example, via suitable supply and discharge devices, such as rotary stars.

The invention claimed is:

1. A fluid mixing system for mixing components for a fluid product comprising a mixing regulator for mixing said components and a feed comprising at least two separate conduits, wherein a base component can be supplied to said mixing regulator in a first conduit and a component to be admixed in a second conduit, where a first sensor for determining the concentration of a chemical compound in said component to be admixed and a Brix sensor for determining a Brix value of said component to be admixed are disposed upstream of said mixing regulator in said second conduit, and where a control unit is provided which controls a mixing process of said components by said mixing regulator in dependence of the concentration measured and the Brix value measured upstream of the mixing regulator.

2. The fluid mixing system according to claim 1, wherein said first sensor is a spectroscopic sensor or comprises a spectroscopic sensor.

3. The fluid mixing system according to claim 2, wherein said spectroscopic sensor is adapted to detect signals of chemical compounds in at least two wavelength ranges in infrared range.

4. The fluid mixing system according to claim 1, wherein said second conduit leads from a buffer tank to said mixing regulator, and said first sensor and said Brix sensor are arranged a distance to said buffer tank which corresponds to at least half the length measured along said conduit.

5. A filling system for filling a fluid product, into a container with at least one filling station which can fill said product into said container, and a fluid mixing system comprising a mixing regulator for mixing said components and a feed comprising at least two separate conduits, wherein a base component can be supplied to said mixing regulator in a first conduit and a component to be admixed in a second conduit, where a first sensor for determining the concentration of a chemical compound in said component to be admixed and a Brix sensor for determining a Brix value of said component to be admixed are disposed upstream of said mixing regulator in said second conduit, and where a control unit is provided which can control a mixing process of said components by said mixing regulator in dependence of the concentration measured and the Brix value measured upstream of the mixing regulator, wherein said fluid mixing system is connected to said filling station and can supply the product to said filling station.

6. The filling system according to claim 5, wherein a buffer tank is arranged downstream of said fluid mixing system and upstream of said filling station, wherein ready-mixed product can be supplied from said fluid mixing system to said buffer tank and remain in said buffer tank until the ready-mixed product is supplied to said filling station to be filled into a container.

7. A mixing method for a fluid product which consists of at least two components using a fluid mixing system, where a mixing regulator of said fluid mixing system mixes a base component, which is supplied to said mixing regulator from a first conduit of said fluid mixing system, and a component to be admixed, which is supplied to said mixing regulator from a second conduit of said fluid mixing system, and a control unit of said fluid mixing system controls said mixing regulator in dependence of a concentration of a chemical compound in said component to be admixed which was measured by a first sensor disposed in said second conduit and a Brix value in said component to be admixed which was measured by a Brix sensor disposed in said second conduit upstream of the mixing regulator.

8. The mixing method according to claim 7, wherein said control unit controls said mixing regulator in real time in dependence of the concentration of the chemical compound measured and the Brix value measured.

9. The mixing method according to claim 7, wherein a quantity of component to be admixed corresponding to the Brix value and a quantity of the base component are each summed up separately by said control unit and wherein said control unit controls said mixing regulator such that the sum of the quantity of component to be admixed and the quantity of said base component corresponds to an intended target value.

10. The mixing method according to claim 9, wherein a value of the summed up quantity of component to be admixed and a value of the summed up quantity of said base component are reduced to a basic value after a predetermined time interval and/or after usage of a predetermined quantity of said base component and/or said component to be admixed.

11. The mixing method according claim 7, wherein said first sensor is or comprises a spectroscopic sensor and measures a quantity of said chemical compound by measuring emission behavior of said component to be admixed.

12. The mixing method according to claim 11, wherein said spectroscopic sensor measures the emission behavior in at least two wavelength ranges in infrared range.

13. The mixing method according to claim 7, wherein said base component is water and said component to be admixed is a fluid syrup.

14. The mixing method according to one of the claim 7, wherein said Brix sensor measures a Brix value of a flavoring chemical compound in said component to be admixed, and said first sensor measures a presence and quantity of at least one other chemical compound that can affect a value measured by said Brix sensor.

15. The mixing method according to claim 14, wherein, for controlling said mixing regulator, said control unit corrects the value measured by said Brix sensor based on a value measured by said first sensor and uses the corrected value of the Brix sensor for controlling said mixing regulator.

* * * * *